United States Patent Office 3,426,654
Patented Feb. 11, 1969

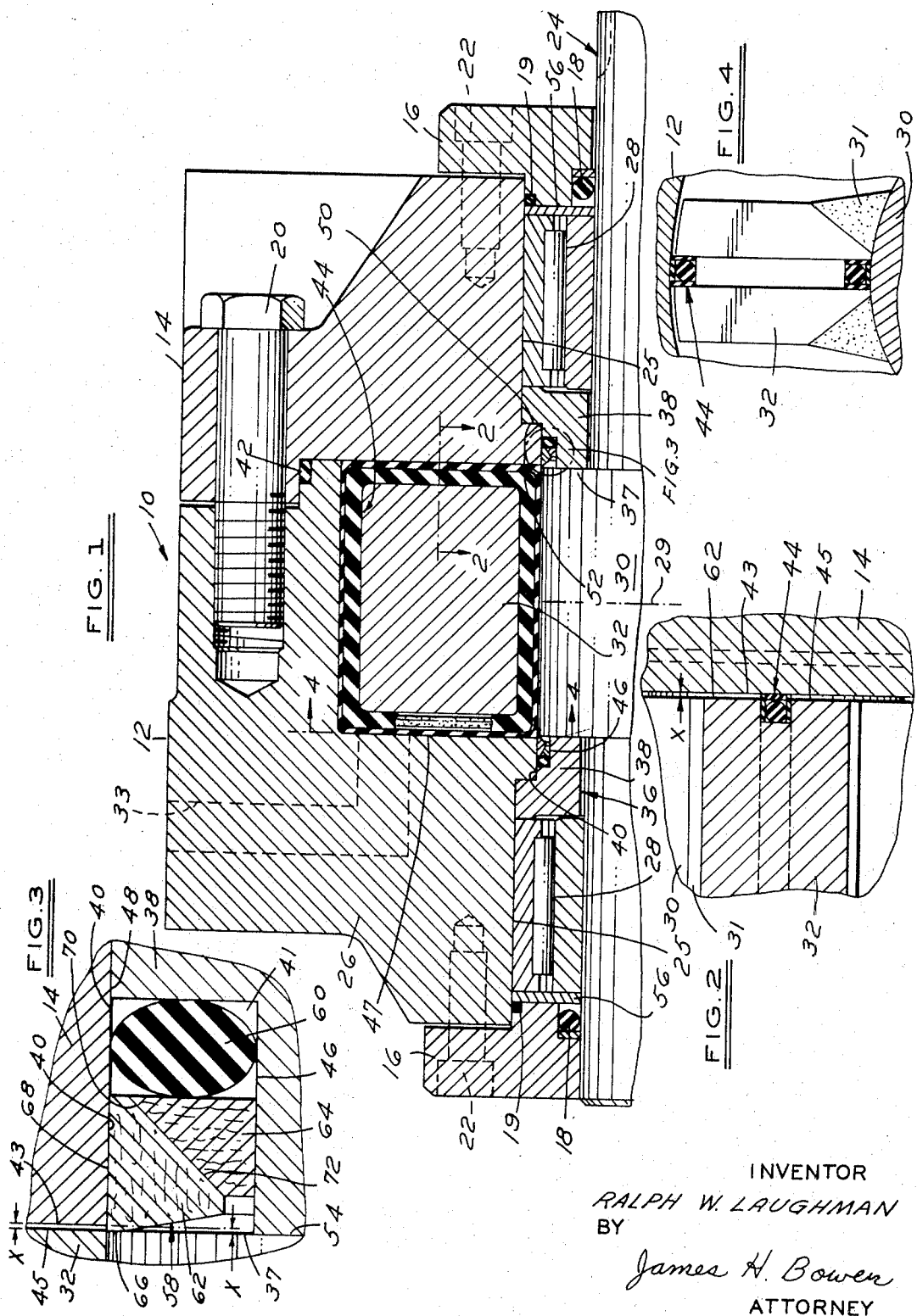

3,426,654
SHAFT MOUNTING AND SEALING CONSTRUCTION FOR ROTARY ACTUATORS
Ralph W. Laughman, Greenville, Mich., assignor to Ex-Cell-O Corporation, Greenville, Ohio
Filed Feb. 6, 1967, Ser. No. 614,366
U.S. Cl. 92—125         10 Claims
Int. Cl. F01c 9/00, 33/72; F16j 9/12

ABSTRACT OF THE DISCLOSURE

A rotary actuator shaft stepped thrust bearing and sealing structure registering within a stepped recess to sealingly position the shaft axially within the actuator chamber.

---

The present invention relates to improvements in rotary vane hydraulic devices and the like and more particularly concerns an improved shaft mounting and sealing construction for hydraulic rotary actuators.

Hydraulic actuators of this character have a radially disposed slidable vane or impeller mounted upon an axial shaft in the housing forming fluid chambers with one or more fixed shoes. A complete description of one type of actuator is disclosed in U.S. Patent 3,215,046, issued Nov. 2, 1965, and assigned to the same assignee of the present invention.

The shaft mounting and sealing arrangement shown in the aforementioned patent have proved satisfactory for hydraulic rotary actuators of relatively low pressure and temperature operating conditions. However, when subjected to pressures of 3,000 p.s.i. or more and at related higher temperatures it has been found that these mountings develop sealing failures after relatively short usage.

It is an object of the present invention to provide a rotary vane hydraulic device capable of operating at high pressures with a minimum of fluid leakage.

Another object of the invention is to provide a novel and improved rotor shaft bearing and seal construction having reference mounting surfaces adapted to position the shaft axially within the working chamber to thereby automatically align the rotor vane in the working chamber.

A further object of the invention is to provide a high pressure rotary hydraulic actuator which is simple in construction, economical of manufacture and reliable in application.

It is another object of the present invention to provide a rotary vane hydraulic device including a novel and improved rotor shaft bearing and seal construction adapted to be inserted from the outer ends of the rotor shaft recesses.

Still another object is to provide a relatively rigid seal ring assembly for use with a shaft bearing having a geometry and hardness to obtain a minimum of friction losses, while retaining structural rigidity and excellent sealing characteristics.

Other objects and advantages of the invention will become apparent from the detailed description and from the appended claims, when considered in connection with the accompanying drawings, in which:

FIGURE 1 is a partial axial elevational section of a hydraulic actuator provided with the improved rotor shaft bearing and seal construction.

FIGURE 2 is a fragmentary sectional view taken on the line 2—2 of FIG. 1.

FIGURE 3 is an enlarged view of the cross section of the shoulder seal, taken from area 3 of FIG. 1.

FIGURE 4 is a fragmentary sectional view taken on the line 4—4 of FIG. 1.

Referring to FIG. 1, we have a rotary actuator, shown in partial axial section at 10, comprising a body housing 12, a head closure portion 14 and end caps 16. The head 14 is secured to the unitary body housing 12 to define a working chamber by securing bolts 20. The cap members 16 are secured to the head 14 and housing 12, respectively, by suitable means such as screws 22. The rotor shaft 24 passes through counterbored or stepped recesses 25 in the head 14 and end wall portion 26 of the housing, and is rotatably supported by roller bearings 28, which are retained in place by the cap members. The cap members 16 are each provided with a shaft seal 18 for preventing leakage along the shaft 24 and seal 19 to prevent leakage along the recess 25.

Within the working chamber a slidable vane or wing 32 is provided which is rigidly connected to the enlarged central hub portion 30 of shaft assembly 24 by welds 31 (FIG. 4). A stationary shoe member (not shown) is positioned within the working chamber as shown, for example, in the Patent No. 3,215,046. The shaft 24 is rotated by applying pressure to one side of the slidable vane 32 and exhausting the chamber formed on the opposite side of the vane with the shoe member. Inlet-exhaust ports, indicated generally at 33, are provided for this purpose.

The mounting structure for the shaft 24 is the same at each end and because of this, only one end of the shaft bearing and sealing means will be described.

The inner face of each of the annular thrust bearing and sealing members, indicated generally at 36 in FIG. 1, is adapted to abut the shoulder 37 at each end of the central hub 30. Each bearing and seal member 36 comprises a stepped thrust bearing portion 38 and a seal group 58 located in the seal cavity 41 formed by the bearing 38 and the inner reduced neck portion 40 of the recess 25. The static seal 42 is provided to prevent escape of hydraulic fluid from within the working chamber. Slidable pressure vane seal assembly 44, mounted in a groove in vane 32, functions to seal the interfitting surfaces of the vane and the housing and the shaft hub are described in the aforementioned Patent No. 3,215,046.

It will be noted in FIG. 2 that a certain clearance distance X is required between the inner face 43 of head 14 and the corresponding side surface 45 of the vane. As a similar clearance distance is required between the internal wall surface 47 and the opposite vane side surface there is a need for positioning the transverse plane of symmetry of the hub 30, indicated by centerline 29, so as to coincide with the transverse plane of symmetry of the working chamber. In this regard it is to be noted in FIG. 3 that the partial section through the vane 32 is offset to one side of the vane seal assembly 44 to show the clearance distance X. As best seen in FIG. 3 the vane 32 is coextensive axially with the hub 30 so that side surface 45 registers with the hub shoulder 37.

The stepped annular thrust bearing 38 of the sealing assembly 36 has an inner reduced end portion 46 and an intermediate reduced portion 48 complementary with the counterbored neck portion 40 of recess 25. The intermediate section 48 forms a stop shoulder 50 (FIG. 1) that abuts or bottoms against the stop face 52 of the head 14. The end portions of the shaft 24 are supported coaxially within the recesses 25 by the before mentioned roller bearing assemblies 28. The roller bearing assemblies 28 are retained in their recesses 25 by means of thrust rings 56 and end caps 16 which are adjustable on the shaft 24 by means of bolts 22 to apply axially inwardly directed preloading through the roller bearing assemblies 28 to the thrust bearings 38. By means of this arrangement sufficient axial preloading is applied to the stop faces 50, 52 to fixably position the bearing end face 54 (FIG. 3)

a distance X beyond the head face 43. It should be noted that while FIG. 3 appears to show surface 54 in contact with shoulder 37 a minimal axial clearance or play of the order of .001 inch total is provided between the overall axial length of hub 30 and the preloaded position of opposed end surfaces 54 to allow the shaft 24 freedom to rotate. In a similar manner the end face of the left hand bearing 38 is located the same axial distance X into the working chamber to precisely center and position the hub 30 within the working chamber. When the shaft hub is mounted in this manner with its raised shoulders 37 abutting against the bearing end faces 54, the vane side surfaces 45 of the vane are thereby automatically aligned with the proper clearances from inner chamber walls 43, 47. A further advantage of applicant's arrangement is that the bearings 38 can be easily removed and replaced for field maintenance without the necessity of special tools and grinding operations as required, for example, in the aforementioned Patent 3,215,046.

As can best be seen in FIG. 3 the seal group 58 consists of a flexible O-ring 60, a continuous annular shoulder cap seal member 62 and a continuous annular backup shoulder cam 64. The cam member 64 is generally wedge-shaped; i.e., it has a generally triangular cross-section. The sections 62 and 64 are engaged along respective conical cam surfaces 70 and 72. Stated otherwise, surfaces 70 and 72 have directional components which are transversely disposed with respect to cavity 41.

The members 62 and 64 are desirably in the form of a fine-weave cotton fabric sheet filler base. Layers or laminations of the sheet filler are impregnated with a thermosetting phenolic resin binder and bonded under high heat and pressure to produce a material having the properties of moisture chemical resistance, machinability and dimensional stability, commercially available under the trade name "Synthane" (grade LB).

The sealing structure is installed by placing the seal group 58 around the reduced portion 46 of the stepped bearing 38, inserting the stepped bearing 38, roller bearing 28 and ring 56 in the counterbored end of recess 25 and urging the members axially by tightening the bolts 22 of end caps 16. The land or heel portion 66 of each of the annular cap seal members 62 abuts the shoulder 37 on each of the ends of the rotor shaft hub to form a dynamic axial seal.

FIG. 3 shows the combination thrust bearing and sealing group 36 after the cap members 16 have been fully secured in place. In the fully assembled state, the inner end face 54 of the stepped bearings extends inwardly between the inner faces of the slight distance x as for example, in one installation it extends approximately .005 inch beyond the inner faces of the housing. The reduced end portion 46 of the same installation forming the seal cavity 41 extends axially a distance of approximately .200 inch and radially approximately .130 inch.

The annular cap seal 62 is hexagon in cross section. The inner narrow land seal portion 66 extends approximately .015 inch radially while the overall radial dimension of the cap seal is approximately .100 inch. The maximum axial dimension of the cap seal is approximately .115 inch and provides the outer peripheral static sealing surface 68 which engages the reduced neck 40 of the head 14. As best seen in FIG. 3 the cap seal 62 is biased by the compressed O-ring 60, acting axially against cam member 64. The 45° sloped surfaces 70, 72 give this axial pressure a radially upward component urging the peripheral surface 68 against member 40. It can be seen that the cam member insures that the radial sealing force acting on surface 68 will be approximately equal to the axial sealing force acting on land 66. Thus as the hydraulic pressure builds up in the working chamber the fluid under pressure will pass into cavity 41 acting on the ring 64 and urging it axially. The narrow land 66 has reduced frictional contact with rotating hub 30 to prevent hang up while the equal balance of the radial and axial forces on cap seal 62 increases the unit sealing force of the surface 66.

Another advantage to the use of the cam member 64 is that is prevents twisting of the cap seal members. This is especially important in the instant sealing bearing structure due to the clearance gap denoted by the dimension $x$. If the cap seal 62 were held solely by the O-ring 60 there would be tendency for the cap seal to twist forcing the heel or land portion 66 to extrude into the clearance between the vane 32 and head inner face 43. The fact that the cap seal 62 and cam 64 are formed from the relatively nonresilient material Synthane also insures that these annular ring members will not have a tendency to extrude into the clearance space.

I claim as my invention:

1. In a rotary hydraulic actuator including a body housing having a wall portion, head closure portion and end cap members forming a fluid chamber, said wall portion and said head closure portion providing inwardly confronting chamber end wall surfaces, rotor shaft means in said housing extending axially therethrough, said rotor shaft means including an enlarged central hub portion for supporting a slidable vane and smaller diameter shaft end portions rotatably mounted in axial bores in said wall portion and said head closure portion, and an annular thrust bearing and sealing means mounted on each of the shaft end portions in contact with the shoulder faces of said enlarged central hub portion,
   (a) each of said axial bores being counterbored to provide a stepped neck portion at the inner end of said bore to form a reference stop surface within said bores, and
   (b) each said bearing having an enlarged outer head portion and an intermediate portion forming stepped shoulder stop means complemental to said stepped bore, said stop surface cooperating with said stop means when in abutment to accurately position said enlarged central hub portion and said slidable vane axially within the fluid chamber.

2. The structure defined in claim 1, wherein the axial length of said enlarged central hub portion being slightly less than the axial distance between said chamber end wall surfaces.

3. The structure defined in claim 1, wherein each said bearing inner end portion is reduced in diameter to form in cooperation with its associated housing neck portion a seal recess to receive a shoulder seal group.

4. The structure defined in claim 3, wherein said shoulder seal group comprises:
   (a) a resilient O-ring member within said recess, and
   (b) a relatively stiff annular cap seal member of generally triangular cross-section within said recess having its inner face in dynamic sealing engagement with the adjacent hub shoulder and its peripheral surface in static sealing engagement with its associated reduced neck portion.

5. The structure defined in claim 4, wherein the axial length of said annular cap seal peripheral sealing surface is of the order of eight times the radial length of said cap seal dynamic sealing surface.

6. The structure defined in claim 3, wherein said shoulder seal group has an annular back-up shoulder cam member of generally triangular cross-section positioned between said O-ring member and said annular cap seal member.

7. The structure defined in claim 6, wherein said annular cap seal member and said annular back-up shoulder member are engaged along complementary conical cam surfaces.

8. The structure defined in claim 7, wherein said conical cam surfaces are formed at an angle of approximately 45° to the principal axis of said shaft.

9. The structure as defined in claim 3, wherein the combined axial length of said bearing intermediate portion and said reduced shank portion being greater than the axial distance of said cooperating neck portion.

10. The structure defined in claim 6, wherein said annular cap seal and said annular back-up shoulder cam members are made of Synthane having a cotton fabric base.

References Cited

UNITED STATES PATENTS

| | | | |
|---|---|---|---|
| 2,556,648 | 6/1951 | Gorsuch | 92—125 |
| 3,128,679 | 4/1964 | Trendle | 92—125 |
| 3,179,018 | 4/1965 | Rumsey | 92—125 |
| 3,359,871 | 12/1967 | Kamman | 92—121 |

PAUL E. MASLOUSKY, *Primary Examiner.*

U.S. Cl. X.R.

92—125; 277—77, 117, 191; 308—36.2